United States Patent [19]

Freitag et al.

[11] Patent Number: 4,888,370
[45] Date of Patent: Dec. 19, 1989

[54] FLAME-RESISTANT POLYAMIDES

[75] Inventors: Dieter Freitag; Thomas Joswig; Karsten Idel, all of Krefeld; Heinz-Josef Füllmann, Leichlingen; Friedemann Müller, Neuss, all of Fed. Rep. of Germany

[73] Assignee: Bayer Aktiengesellschaft, Leverkusen Bayerwerk, Fed. Rep. of Germany

[21] Appl. No.: 241,765

[22] Filed: Sep. 7, 1988

Related U.S. Application Data

[63] Continuation of Ser. No. 39,692, Apr. 20, 1987, abandoned.

[30] Foreign Application Priority Data

May 2, 1986 [DE] Fed. Rep. of Germany ....... 3614899

[51] Int. Cl.$^4$ .......................... C08K 5/06; C08L 71/04
[52] U.S. Cl. .................................... 524/100; 524/101; 524/119; 524/123; 524/125; 524/130; 524/132; 524/538; 525/397
[58] Field of Search ............... 524/100, 101, 119, 123, 524/125, 130, 132, 538; 525/397

[56] References Cited

U.S. PATENT DOCUMENTS

| | | | |
|---|---|---|---|
| 3,836,501 | 9/1974 | Tacke et al. | 524/431 |
| 4,141,880 | 2/1979 | Nametz et al. | 525/397 |
| 4,600,741 | 7/1986 | Aycock et al. | 525/397 |
| 4,659,763 | 4/1987 | Gallucci et al. | 525/397 |
| 4,678,839 | 7/1987 | Hallgreen et al. | 525/397 |
| 4,681,915 | 7/1987 | Bates et al. | 525/397 |

FOREIGN PATENT DOCUMENTS

| | | |
|---|---|---|
| 2164767 | 12/1985 | European Pat. Off. . |
| 3000221 | 7/1981 | Fed. Rep. of Germany . |
| 2169363 | 1/1973 | France . |

Primary Examiner—John Kight
Assistant Examiner—Kriellium Morgan
Attorney, Agent, or Firm—Connolly and Hutz

[57] ABSTRACT

Flame-resistant, thermoplastic polyamide moulding materials which contain 0.01–4% by weight of polyphenylene oxides as flameproofing agent and which are prepared by mixing the components in the melt.

8 Claims, No Drawings

FLAME-RESISTANT POLYAMIDES

This application is a continuation of application Ser. No. 039,692 filed Apr. 20, 1987, now abandoned.

The invention relates to flame-resistant polyamides moulding materials which have been flameproofed by addition of polyphenylene oxides.

There are various possibilities for flameproofing polyamides, thus for example by adding red phosphorus, particularly to glass fibre-reinforced polyamides, by adding a combination of inorganic metal compounds, such as, for example, ZnO, and organic halogen compounds, such as, for example, halogenated Diels-Alder adducts, or by adding melamine or melamine derivatives.

At the same time, flameproofed, halogen-free polyamide moulding materials which also make a pale coloration possible are constantly becoming more important, particularly for the electrical sector.

In this area, therefore, only flameproofing using melamine or melamine derivatives is suitable. The migration of the flameproofing agent, which occurs to an increased extent in an atmosphere having high moisture content, has a disadvantageous effect in the case of these flameproofed polyamides. This can lead to smearing of the contact points in the case of electrical injection-moulded parts. In addition, the oxygen index is not improved during this flameproofing of the polyamides.

Surprisingly, it has now been found that polyamide moulding materials which are flameproofed using a polyphenylene oxide (PPO) do not have these disadvantages.

The invention therefore relates to flame-resistant thermoplastic polyamide moulding materials comprising 0.01–4% by weight, preferably containing 0.01–2% by weight, relative to polyamide, of polyphenylene oxides.

Polymers having the repeating structural unit of the general formula I or II may advantageously be employed as polyphenylene oxides:

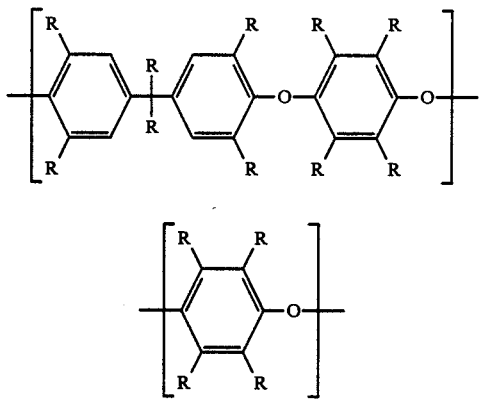

in which

R, identically or differently, represents H, an alkyl radical preferably having $C_1$–$C_4$, an aryl radical preferably having $C_6$–$C_{14}$, or a halogen atom, such as Cl, Br or F.

The polyphenylene oxides may preferably be prepared by polycondensation of bisphenols of the general formula III and/or monophenols of the general formula IV with the aid of oxygen in the presence of metal catalysts. The molecular weight is controlled here by means of the reaction time. Processes for the preparation of PPO are described in U.S. patent specification No. 3,306,874 and U.S. patent specification No. 3,306,875.

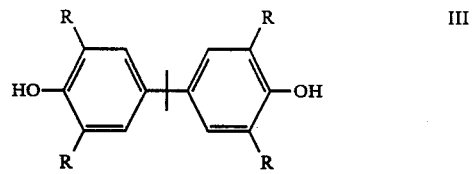

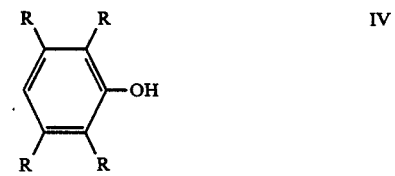

In the general formula III and IV, the radicals R have the abovementioned meaning.

Monofunctional polyphenylene oxides based on 2,6-dimethylphenol or 2-phenylphenol and/or bifunctional polyphenylene oxides from 2,6-dimethylphenol are preferably employed as monofunctional component and 2,2-bis(4-hydroxyphenyl)-propane, 2,2-bis(3,5-dimethyl-4-hydroxyphenyl)-propane, bis(4-hydroxyphenyl)methane or bis(3,5-dimethyl-4-hydroxyphenyl)methane are preferably employed as the bifunctional component.

The polyphenylene oxides should have a molecular weight $M_n$ from 500 to 4,000, which is determined by terminal group determination of the OH functions.

Polyamides which are prepared by known polycondensation processes starting from diamines and dicarboxylic acids and/or lactams having at least 5 ring members or corresponding $\omega$-amino acids are used for the preparation of the moulding materials according to the invention. Suitable starting materials are aliphatic and aromatic dicarboxylic acids, such as adipic acid, 2,2,4- and 2,4,4-trimethyladipic acid, azelaic acid, sebacic acid, decanedicarboxylic acid, dodecanedicarboxylic acid, isophthalic acid and terephthalic acid, aliphatic and aromatic diamines, such as hexamethylenediamine, 2,2,4- and 2,4,4-trimethylhexamethylenediamine, the isomeric diamino-dicyclohexyl-methanes, diamino-dicyclohexylpropanes, isophoronediamine, the isomeric xylylenediamine and bisaminomethyl-cyclohexane, aminocarboxylic acids, such as $\epsilon$-aminocaproic acid, $\omega$-aminoundecanoic acid, $\omega$-aminolauric acid, or the corresponding lactams. Copolyamides of several of the monomers mentioned may also be employed.

Preferred polyamides are polyamide 6 and polyamide 66.

The polyamide moulding materials according to the invention are preferably prepared by mixing the PPO with the polyamide in a single or twin screw extruder of conventional construction at customary temperatures. To this purpose, the components can be mixed before the extrusion or metered into the already melted polyamide.

The flameproofed polyamides may contain the conventional additives and auxiliaries, for example one or more fillers or reinforcing materials, particularly glass fibres in amounts from 10–60% by weight, relative to the total mixture. Glass microbeads, carbon fibres, chalk, quartz, such as, for example, novaculite, and silicates, such as asbestos, feldspar, mica, talc, wollastonite and kaolin in calcinated and noncalcinated form are suitable as further fillers and reinforcing materials. In addition, dyestuffs and pigments, particularly carbon blacks and/or nigrosine bases, stabilizers, processing aids and antidust agents may be mentioned, furthermore toughening agents, for example copolymers of ethylene poly(meth)-acrylates or grafted polybutadienes. They may also contain further flameproofing agents, such as melamines, cyanuric acids, barbituric acids, salts from these components or reaction products of cyanuric or barbituric acids as they are mentioned in U.S. Pat. Nos. 3,980,618 and 4,001,177, German Auslegeschrift 1,694,254 or in EP-A 44,424. Further flame-proofing additives on phosphor-basis, such as preferably polyphosphonates, according to own, non published patent applications DE-P 3,613,491 and DE-P 3,613,490 may be used. These additional flame-proofing agents may be used in quantities of 0.5 to 15% by weight, preferably 0.5 to 10%. Halogen-containing flame-proofing additives or red phosphorous are less preferred.

The thermoplastic moulding materials according to the invention are processed according to the known methods by injection-moulding or extrusion. The flameproofed polyamide moulded articles are particularly suitable for use in the electrical and automotive sector and are used, for example, for the production of housings and covers for technical equipment, such as electrical household appliances, and for automotive parts.

EXAMPLES

Polyamide 66 (relative viscosity 3.0; measured at 25° C. on a 1 percent solution in m-cresol) is mixed with various polyphenylene oxides in a Werner and Pfleiderer type ZSK 32 twin screw extruder at a melt material temperature of 274°-280° C. and a throughput of 10 kg/h. The mixture is cooled as bristle in a waterbath. After granulation and drying, the mixture is processed into test articles.

Various polyphenylene oxides are compared in Table 1 (Examples 1–9). Table 2 (Examples 10–14) is concerned with the concentration-dependent action.

The oxygen index (OI) was used as a measure of the effect of fire (corresponding to ANSI/ASTM D 2863-77; sample ignition using an external flame proof below).

TABLE 1

| Modification of PPO (2% by weight in PA 66) | | | | |
|---|---|---|---|---|
| | Monomer units of PPO | | | OI |
| Example | bisphenol | monophenol | Mn | (% O₂) |
| 1 | HPP(2) | DMP(3) | 800 | 22.5 |
| 2 | DHPP(4) | DMP(3) | 800 | 22.5 |
| 3 | DHPP | DMP(3) | 1600 | 23.0 |
| 4 | HPM(5) | DMP(3) | 800 | 22.5 |
| 5 | DHPM(6) | DMP(3) | 800 | 23.0 |
| 6 | — | DMP(3) | 800 | 21.5 |
| 7 | — | DMP(3) | 1600 | 21.5 |
| 8 | — | OPP(7) | 1700 | 21.0 |
| 9 | — | — | — | 19.5 |

TABLE 2

| PPO based on: DHPP(4)/DMP(3); Mn ~ 800 | | | | | |
|---|---|---|---|---|---|
| Examples | 10 | 11 | 12 | 13 | 14 |
| % by weight PPO | 0.1 | 0.5 | 1.0 | 2.0 | 4.0 |

TABLE 2-continued

| PPO based on: DHPP(4)/DMP(3); Mn ~ 800 | | | | | |
|---|---|---|---|---|---|
| Examples | 10 | 11 | 12 | 13 | 14 |
| OI | 24.0 | 23.5 | 22.5 | 22.5 | 21.0 |

(2)2,2-bis(4-hydroxyphenyl)propane
(3)2,6-dimethylphenol
(4)2,2-bis(3,5-dimethyl-4-hydroxyphenyl)propane
(5)bis(4-hydroxyphenyl)methane
(6)bis(3,5-dimethyl-4-hydroxyphenyl)methane
(7)OPP = o-phenylphenol

We claim:
1. A flame-resistant, thermoplastic polyamide moulding material comprising 0.01 to 2% by weight of a polyphenylene oxide as flameproofing agent, wherein the polyphenylene oxide has a molecular weight of 500 to 4,000 as measured by terminal —OH group determination, and has the repeating structural unit of the general formula

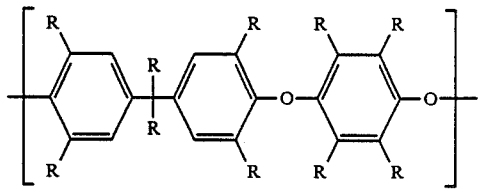

or

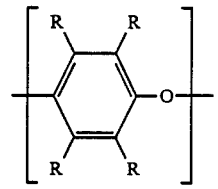

in which the radicals R, identically or differently, denote hydrogen or an alkyl or aryl radical.

2. A moulding material according to claim 1 in which the polyphenylene oxide is obtained from 2,6-dimethylphenol and from one of the following compounds 2,2-bis(4-hydroxyphenyl)propane, 2,2-bis(3,5-dimethyl-4-hydroxyphenyl)propane, bis(4-hydroxyphenyl)methane or bis(3,5-dimethyl-4-hydroxyphenyl)methane.

3. A moulding material according to claim 1, in which the polyamide is polyamide 6 or polyamide 66.

4. A moulding article whenever formed of a moulding material according to claim 1.

5. A moulding material according to claim 4 wherein each R independently denotes C₁ to C₄ alkyl, C₆ to C₁₄ aryl or hydrogen.

6. A moulding material according to claim 4 wherein the polyamide is the polycondensation product of at least one diamine with at least one dicarboxylic acid or lactam having at least five ring members or their corresponding ω-amino acids.

7. A process for rendering thermoplastic polyamide flameresistant, characterized by mixing 0.01 to 2% by weight of polyphenylene oxide with the thermoplastic polyamide in the melt, optionally in the presence of further known flameproofing agents, selected from the group of melamines, cyanuric acids, barbituric acids and there salts and polyphosphonates, wherein the polyphenylene oxide has the formula

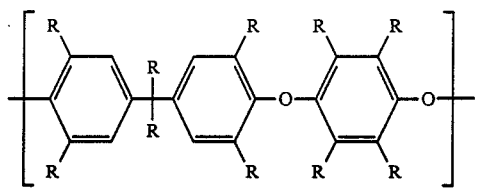
or
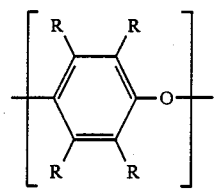
in which the radicals R, identically or differently, denote $C_1$ to $C_4$ alkyl, $C_6$ to $C_{14}$ aryl or hydrogen.
8. A moulding material according to claim 4 wherein the polyphenylene oxide has a molecular weight of 800 to 1700, measured by terminal —OH group predetermination.
* * * * *